United States Patent [19]
Otsuka

[11] Patent Number: 6,092,555
[45] Date of Patent: *Jul. 25, 2000

[54] ABSORBING BODY AND A COMBINATION OF AN ABSORBING BODY AND VEHICLE BODY PARTS

[75] Inventor: Kunio Otsuka, Tokyo, Japan

[73] Assignee: Ohtsuka Co., Ltd., Tokyo, Japan

[*] Notice: This patent is subject to a terminal disclaimer.

[21] Appl. No.: 09/229,698

[22] Filed: Jan. 13, 1999

Related U.S. Application Data

[63] Continuation of application No. PCT/EP97/00046, Jan. 8, 1997.

[30] Foreign Application Priority Data

Jul. 15, 1996 [JP] Japan ................................ 8-184643

[51] Int. Cl.$^7$ ........................................ F16F 7/12
[52] U.S. Cl. .................. 138/118; 138/177; 138/178; 138/137; 138/138; 296/189
[58] Field of Search .................... 138/118, 121, 138/122, 137, 129, 132–134, 177, 178, 138; 296/146.7, 35.2, 189

[56] References Cited

U.S. PATENT DOCUMENTS

| | | | |
|---|---|---|---|
| 3,947,056 | 3/1976 | Schwanz | 280/150 B |
| 3,974,467 | 8/1976 | Tobita et al. | 333/95 A |
| 4,273,359 | 6/1981 | Scholz et al. | 280/740 |
| 4,890,877 | 1/1990 | Ashtiani-Zarandi et al. | 296/146 |
| 5,033,593 | 7/1991 | Kazuhito | 188/377 |
| 5,325,893 | 7/1994 | Takagi et al. | 138/143 |
| 5,345,721 | 9/1994 | Stein et al. | 296/146.7 X |
| 5,431,445 | 7/1995 | Wheatley | 296/189 X |
| 5,456,513 | 10/1995 | Schmidt | 296/39.1 |
| 5,680,886 | 10/1997 | Ohtsuka | 138/121 |

FOREIGN PATENT DOCUMENTS

| | | |
|---|---|---|
| 0561211 A1 | 9/1993 | European Pat. Off. . |
| 0561211 B1 | 1/1995 | European Pat. Off. . |
| 2312202 | 9/1974 | Germany . |
| 2606640 C2 | 12/1985 | Germany . |
| 3740681 C2 | 8/1989 | Germany . |
| 3038252 C2 | 4/1990 | Germany . |
| 4003952 A1 | 8/1991 | Germany . |
| 19512525 C1 | 4/1996 | Germany . |
| 19504659 A1 | 8/1996 | Germany . |

OTHER PUBLICATIONS

372 *Automotive Engineering*, vol. 87, No. 4. p. 56, "Electronic Sensor" and Figure 4, dated Apr., 1979.
PCT/EP9700046, PCT/ Europe Search Report, dated Oct. 23, 1997.

Primary Examiner—Patrick Brinson
Attorney, Agent, or Firm—Fitch, Even, Tabin & Flannery

[57] ABSTRACT

A body for absorbing impact energy is designed as a flexible pipe and is characterized in that the walls of the pipe are made of several layers and comprise at least one metal layer and at least one paper or plastic layer. The cross-section of the absorbing body is designed in such a way that at least one section of its wall is substantially straight and extends substantially parallel to the direction from which an impact is expected.

17 Claims, 6 Drawing Sheets

ABSORBING BODY AND A COMBINATION OF AN ABSORBING BODY AND VEHICLE BODY PARTS

This is a continuation, of prior application Ser. No. PCT/EP97/00046, filed Jan. 8, 1997 and designating the United States of America, which is hereby incorporated herein by reference in its entirety.

TECHNICAL FIELD

The invention relates to an absorbing body and a combination of an absorbing body and vehicle body parts.

PRIOR ART

An absorbing body in the form of a flexible pipe (or tube) according to the preamble of claim 1 is described in DE 195 04 659 A1 and is used for installation between two boundary areas, e.g. the surfaces of vehicle body parts. As is generally known, special demands in terms of passenger safety are placed on vehicles such as cars and commercial vehicles. To guarantee safety, it is known that the sheet metal used to make the body should be designed—by increasing the thickness of the sheet metal—to be so strong that passenger safety is raised in the event of forces which act upon the vehicle. This measure nevertheless causes the vehicle body weight to increase, thus increasing both the vehicle's fuel consumption and its material and production costs. For economic reasons, it is therefore not immediately possible to design a vehicle body—by increasing the thickness of the sheet metal used—in such a sturdy manner that passenger safety is always guaranteed. There are also zones on a vehicle body at which an increase in sheet metal thickness is impossible due to geometrical conditions or due to the other components present in this area.

The prior absorbing body was used to produce a vehicle body component which considerably raises occupant safety while justifiably increasing the body weight. The known absorbing body is formed by a flexible pipe that has a grooved wall and round cross section and which when impact energy acts upon a component located thereover is deformed such that a large part of the impact energy is absorbed by the deformation of the tubular absorbing body. As a result, the impact energy reaches the components in the interior of an occupant cell to a considerably reduced extent such that passenger safety is ensured. The known absorbing element may be in the form of a corrugated pipe (or tube) comprising a plurality of layers of sheet aluminum.

EP 0 266 084 B1 describes an absorbing element built up of plate elements; it has an orthogonal box-like cross section and its plate sections running parallel to the direction of impact are corrugated. Another deformation element is described in DE 30 38 252 C2. It consists of a plurality of pipes that are adjacent to one another in parallel and which have single-layer metal or plastic walls. DE 26 06 640 C2 describes a corrugated pipe (or tube) which acts as a deformation member disposed in the impact region of the knees of a vehicle driver and front passenger and whose surfaces across the direction of impact are intended to be corrugated. DE-A1 2 312 202 discloses a tubular deformation member attached to a support beneath the instrument panel of a motor vehicle. Finally, DE 40 03 952 A1 describes the use of hexagonal deformation elements for the absorption of energy applied to a knee pad in the event of a collision.

The invention is based upon the object of providing an impact-energy absorbing body in the form of a flexible pipe exhibiting improved absorption and processing characteristics.

DESCRIPTION OF THE INVENTION

The wall of the flexible pipe that forms the absorbing body is therefore built up of several layers. The absorbing body according to the invention has at least one layer of metal and at least one layer of paper or plastic. In terms of its cross section, the absorbing body is also designed such as to form at least one largely straight wall section which is largely parallel to the direction from which a force is to be expected.

In the absorbing body according to the invention, the metal layer particularly ensures that this body exhibits deformation characteristics particularly suitable for the absorption of impact energy which acts on vehicle body components in the event of a collision. The use of at least one layer of suitable paper or plastic enables the advantageous properties of these materials to be utilized for the absorbing element as regards the production of the absorbing body and its attachment to a component.

In accordance with the invention, particularly beneficial deformation characteristics of the absorbing body can be obtained by the at least one wall section which extends in a largely straight manner in terms of cross section. If a force acts on the straight wall section, parallel to its course, good absorption of the energy that takes effect does in fact occur even when there is comparatively little deformation. This measure according to the invention can particularly produce absorption characteristics which are much more beneficial than those absorption characteristics exhibited by tubular absorbing bodies with a largely round cross section, as are known in the prior art. Such absorbing bodies undergo much more extensive deformation during the absorption of forces taking effect, and are therefore less advantageous from the point of view of safety.

Preferred embodiments of the invention are described.

According to a preferred embodiment of the absorbing body according to the invention, this absorbing body comprises a grooved winding tube which is helically wound from a plurality of strips to form a plurality of layers for the walls of the tube. When the absorbing body is wound in this embodiment, the materials intended for the metal layers, e.g. aluminum, aluminum alloys and steel, are therefore used in the form of strips. These strips are processed, together with strips of paper or plastic which preferably run in above or below same, to produce a winding tube which forms the absorbing body according to the invention. A particularly low production outlay can be obtained by producing the absorbing body according to the invention as a grooved winding tube. It has also proved to be advantageous if the peaks and troughs of the corrugations formed on the tube walls are used to absorb those forces which take effect. In the region of the wall section that is largely straight according to the invention, the absorbing body is aligned such that a force that takes effect runs parallel to this wall section and hence parallel to the longitudinal extension of the peaks and troughs of the corrugations formed on the wall section. Due to the helically shaped winding of the grooved strips in this embodiment of the absorbing body according to the invention, the peaks and troughs of the corrugations run at a slight angle—because of the helix angle of the helically shaped winding—to the force that takes effect. When forces take effect, the peaks and troughs of the corrugations are nevertheless deformed in their longitudinal direction, which is extremely beneficial for the absorption of large forces and energies when there are comparatively small deformations.

It is preferred in this embodiment that the strips are wound with lateral overlaps. In this embodiment, a structure of the absorbing body according to the invention which e.g. in the case of a simple overlap consists of twice the number of the aforementioned paper, plastic and metal layers is therefore obtained at least in the region of the overlaps. Provided that the absorbing body according to a preferred embodiment is therefore produced as a winding tube having an inner and an outer layer of paper or plastic and two intermediate layers of metal, the absorbing body exhibits a two-fold superimposed structure of the aforementioned type in the area of the overlaps. The overlaps formed according to this embodiment can achieve particularly good strength for the absorbing body according to the invention. At the same time, the production of the absorbing body as a winding tube represents a particularly economic manufacturing process.

As regards the at least one metal layer of the absorbing body according to the invention, it is preferred that this layer comprises aluminum, an aluminum alloy or steel. As regards the first two materials, the low density of these materials and the low weight achievable as a result can be taken advantage of for the absorbing body. In particular, the safety of a vehicle body is clearly improved without having to take account of a considerable increase in body weight. The use of steel for the metal layer of the absorbing body according to the invention offers the benefits of high material strength and low costs for this standard material.

According to a preferred embodiment of the invention, the absorbing body has a layer of paper or plastic both on the inside and on the outside of its wall or walls. Particularly the formation of a layer of the named materials on the outside of the absorbing body enables same to be secured to a vehicle body section by means of a suitable adhesive or adhesive tape. As is the case when the outside is composed of metal, an ordinary connecting element, such as one or more screws, or a clip, can, of course, also be used for this purpose in the above embodiment. The layers of paper also offer the very frequently desired advantage of silencing noise and suppressing rattling.

The absorbing body according to the invention also preferably comprises a number of metal layers divisible by two. If the absorbing body is designed in the form of a winding tube, two strips of metal optionally with lateral overlaps are therefore wound. The materials of the two layers can be chosen in any combination of the materials aluminum, an aluminum alloy and steel. Both metal layers of the absorbing body according to the invention may therefore consist of the same aforementioned material, or the above materials may alternatively be randomly combined with one another for the inner and the outer metal layer.

As regards the orientation of the largely straight wall section of the absorbing body in relation to the direction from which a force is expected (FIG. 2A), it has proved to be particularly advantageous if the wall section deviates by no more than an angle of 15°, preferably 10° and particularly 5°, from the direction from which the force is expected. In this version, it was possible to determine particularly beneficial absorbing characteristics.

As regards the largely straight wall section, it has also proved advantageous if this wall section, when viewed in cross section, is bulged in the middle of its length to an extent which is no more than one fifth, preferably no more than one twentieth of the length of the wall section (FIG. 2B). With these values, the described advantageous effects can be obtained in the case of deformation characteristics exhibited by the absorbing body in relation to the forces absorbed. It was also possible to determine particularly beneficial properties when there was a bulge in the order of one tenth and one fiftieth of the length of wall.

With regard to the absorbing body according to the invention, advantageous characteristics have been obtained when this absorbing body has a polygonal cross section, the corners of which may be alternatively rounded off. In terms of its cross section, the absorbing body may as a result be advantageously adapted to the component or components at or between which it can be attached.

The use of a symmetrical cross section, e.g. a quadratic, rectangular, rhombic, hexagonal or octagonal cross section, is particularly intended for the absorbing body. The aforementioned cross-sectional shapes can particularly achieve an advantageous adaptation of the absorbing body's shape to the surrounding components.

As regards corresponding applications, it is also preferred that the cross section of the absorbing body should be asymmetrical in shape, e.g. triangular, trapezoidal or pentagonal.

As regards special applications, it has proved beneficial if at least one side of the absorbing body with a polygonal cross section is designed to be concavely or convexly bent (FIG. 2C). In certain applications, special advantages can also be achieved if the absorbing body's wall extends in cross section such that this wall is inwardly bent to form a negative angle at at least one site (cf. FIG. 9).

According to another aspect of the invention, a combination of an above-described absorbing body with at least one vehicle body component is conceived. Such a combination represents the preferred intended use of the absorbing body according to the invention. One inner wall and one outer wall at or between which the absorbing body is secured are preferred as vehicle body components between which the absorbing body according to the invention is to be placed. As a result, the absorbing body according to the invention increases passenger safety in a particularly advantageous way in that the impact force acting on the outer wall is absorbed to a considerable degree by the absorbing body located therebelow.

As regards this combination of the absorbing body according to the invention with at least one body component, it is preferred that the absorbing body is fitted such that not only its largely straight wall section runs parallel to the direction from which a force is expected, but that the pipe's longitudinal axis also extends largely perpendicular to the direction from which the force is expected. When installed into a vehicle body, the absorbing body's benefits according to the invention can be used to best effect in this embodiment of the absorbing body according to the invention.

BRIEF DESCRIPTION OF THE DRAWINGS

An exemplary embodiment of the invention depicted in the drawings will now be described in more detail.

FIG. 2 shows a front view of the absorbing body depicted in FIG. 1;

DESCRIPTION OF A PREFERRED EMBODIMENT OF THE INVENTION

Figure 1:
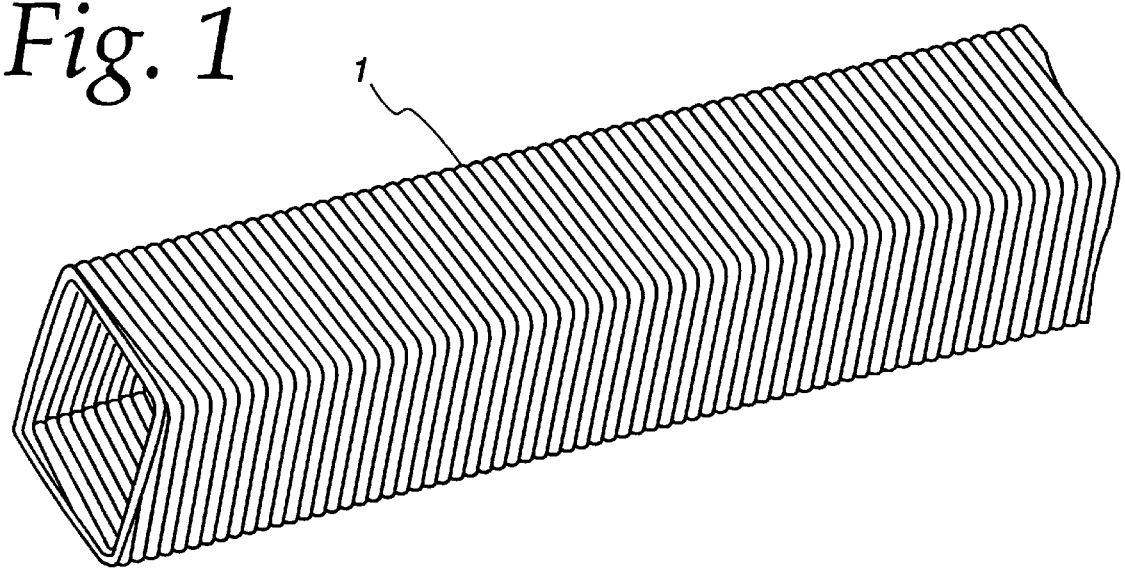
FIG. 1 shows a perspective view of an absorbing body according to the invention.

As can be identified in FIG. 1, the absorbing body 1 according to the invention is formed by an elongated, flexible pipe having a grooved wall. In this particular case, the pipe comprises a tetragonal, particularly quadratic cross section. The grooves formed both on the outside and on the inside of the pipe and obtained by producing the shown absorbing body as a flexible winding tube made of corrugated strip material can also be identified in the perspective representation of FIG. 1. This structure will be described below in detail with reference to FIG. 4.

Figure 2A:
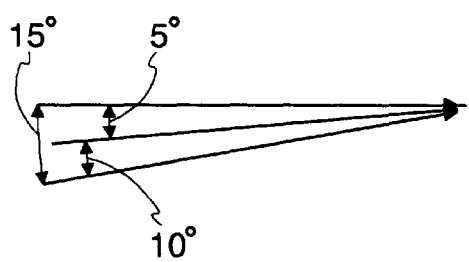
FIG. 2A shows a cross-sectional view of the absorbing body depicted in FIG. 1 and directions from which the impact force is expected.
Figure 2B:
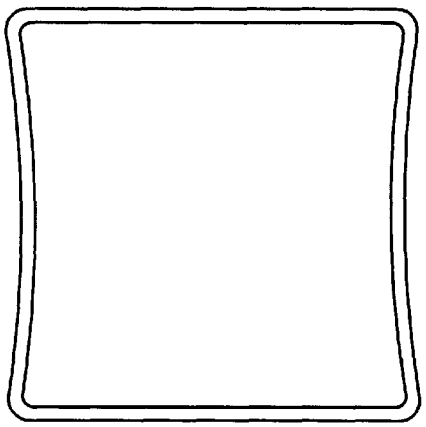
FIG. 2B shows a cross-sectional view of the absorbing body depicted in FIG. 1 wherein the absorbing body includes at least one wall portion which is concavely curved.
Figure 2C:
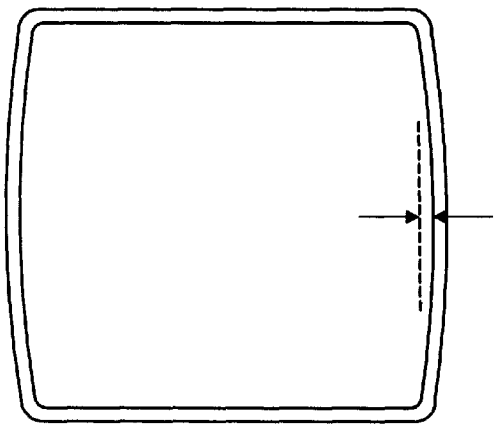
FIG. 2C shows a cross-sectional view of the absorbing body depicted in FIG. 1 wherein the absorbing body includes a wall portion which is largely straight in the installation state and which is bulged when viewed in cross section and is convexly curved.

The largely quadratic cross section of the depicted absorbing body 1 can again be nicely identified in FIG. 2. The length L which, as will be described below, is examined in the test of the characteristics of the absorbing body 1 is evident from the depicted front view.

Figure 3:
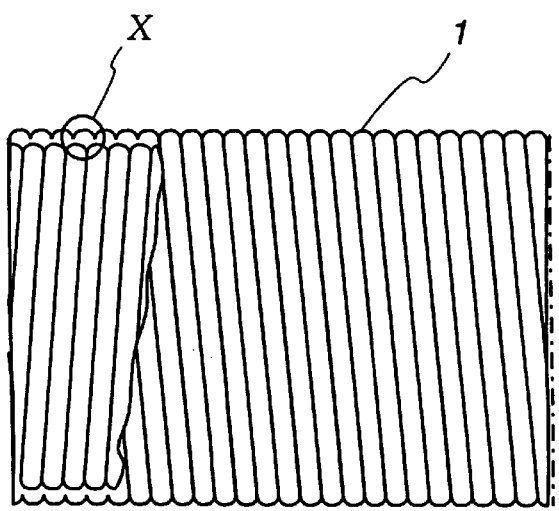
FIG. 3 shows a partial longitudinal sectional view of the absorbing body depicted in FIG. 1.

It can be easily seen in the side view of FIG. 3 containing a partial longitudinal section that at the front side of the absorbing body 1, the grooves formed on the outside are inclined to the right from top to bottom. This shape is obtained on account of the helical winding of the absorbing body 1 made of corrugated strip material.

Figure 4:
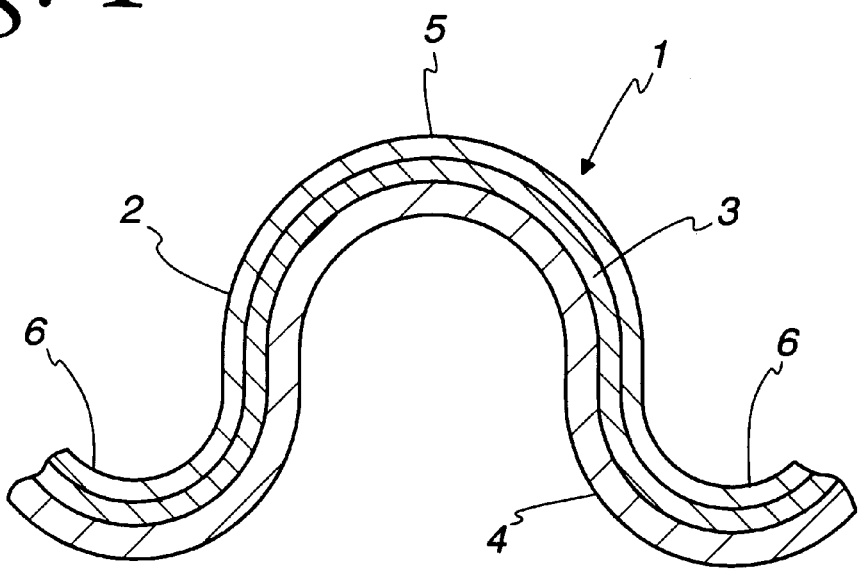
FIG. 4 shows detail X according to FIG. 3.

The structure of the walls of the absorbing body 1 can be identified in detail in FIG. 4. From the outside inwards, the multi-layer wall of the absorbing body 1 consists of an outer layer 2 which in this particular case comprises paper, i.e. kraft paper, a central layer 3 composed of sheet metal, iron or hard aluminum foil, and an inner layer 4 for which paper is again used. In an axial direction, the wall layered in this way has a corrugated shape, so that protruding sites 5 and lowered sites 6 alternate respectively. As is apparent in conjunction with FIGS. 1 and 3, both the lowered and protruding sites 6, 5 on the absorbing body extend helically.

In this particular case, the strips of kraft paper used for the outer layer 2 and the inner layer 4 have a thickness of $\geq 0.2$ mm and a width of $\geq 30$ mm. The central layer 3 is formed by the use of a metal strip having a thickness of $\geq 0.05$ mm and a width of $\geq 30$ mm.

Figure 5A:
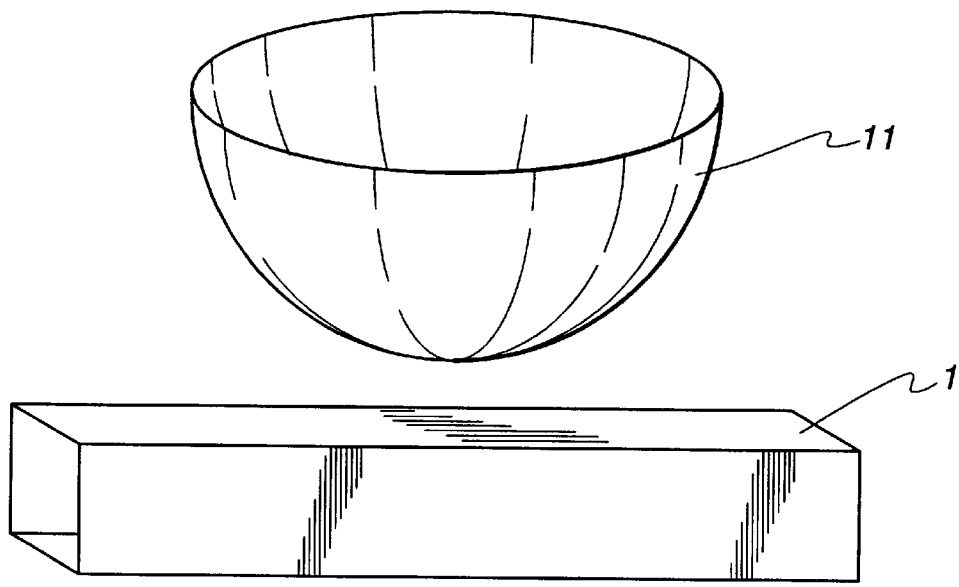
FIG. 5A shows a schematic representation of the test of the characteristics of an embodiment of the absorbing body according to the invention.
Figure 5B:
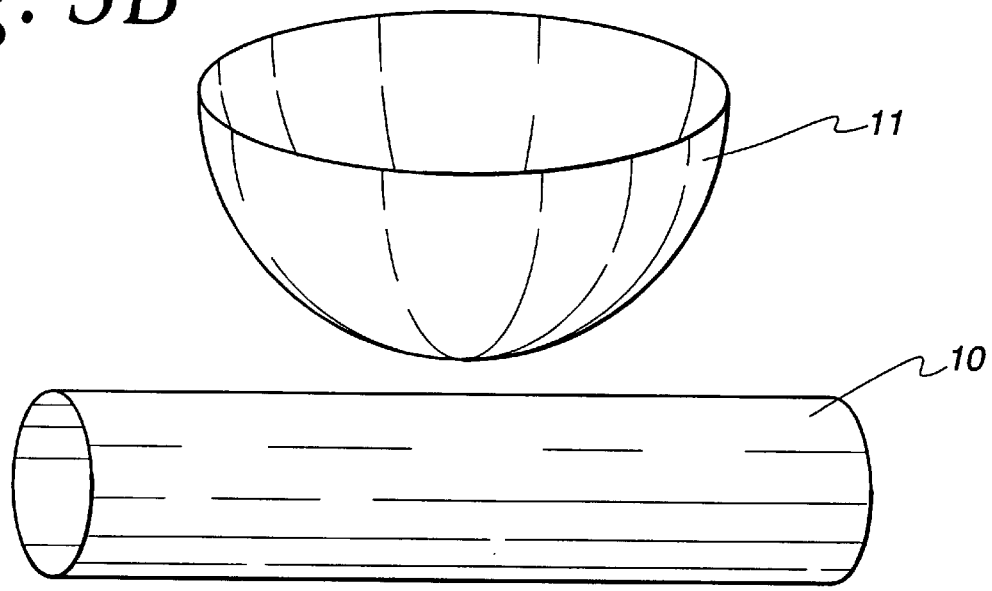
FIG. 5B shows a schematic representation of the test of the characteristics of a comparative example.

FIGS. 5A and 5B schematically show the test setup for the test of the characteristics of the absorbing element according to the invention (FIG. 5A) and a comparative example with a circular cross section (FIG. 5B). While the absorbing body 1 depicted in FIGS. 1 to 3 is shown in FIG. 5A, an absorbing body 10 with a circular cross section is tested in the test setup according to FIG. 5B. The external diameter of the absorbing body 10 is identical to the outer lateral length of the absorbing body 1 shown in FIGS. 1 to 3, thus requiring the same installation height. The two absorbing bodies 1, 10 are identical in terms of axial length, thickness of the material layers, distance and number of windings of the coil.

As part of the test of the characteristics, a pressure is exerted on the two absorbing bodies 1, 10 by means of a pressure device comprising a hemisphere 11 with a diameter of 165 mm. The change in internal dimension L (cf. FIG. 2) that arises is measured. The hemisphere 11 is moved at a rate of 50 mm/min or 100 mm/min with increasing force.

Figure 6:
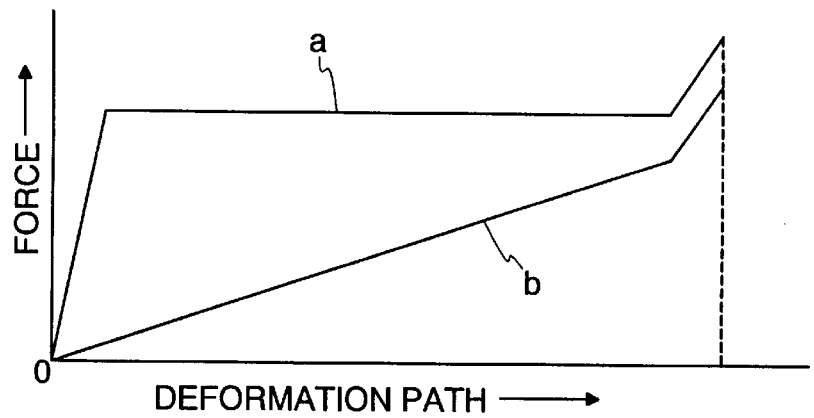
FIG. 6 shows a graph of the results of the test of the characteristics.

The results of this test are qualitatively depicted in FIG. 6. Line a represents the result for the absorbing body 1, while line b applies to the absorbing body 10 used as a comparative example. When there is a force of equal size, the rectangular absorbing body 1, compared to the round absorbing body 10, exhibits lower deformation in the initial phase and during this initial phase it already absorbs to a considerable extent the energy applied by external force. As soon as the force reaches a certain size, deformation rapidly increases. In contrast, the round absorbing body 10 exhibits a load/deformation dependency characteristic which rises in a largely linear manner, i.e. it already exhibits greater deformations at a lower load.

As part of these tests, the load needed to reduce the lateral length L, shown in FIG. 2, to zero, i.e. to compress the absorbing body completely at least zonally, was ascertained for two different types of absorbing body according to the invention. The dimensions and materials used are indicated in the following table for each type.

| Type | External width [mm] | Shape | Constituents | | | No. of corrugations per 100 mm length | Weight [g] per 100 mm length |
|---|---|---|---|---|---|---|---|
| | | | Kraft paper | Hard aluminum | Kraft paper | | |
| 1 | 20 | quadratic | t 0.2 × W 60 | t 0.09 × W 35 | t 0.2 × W 60 | 52 | 11.03 |
| 2 | 26 | ↑ | ↑ | t 0.1 × W 35 × 2 | ↑ | 52 | 23.49 |

NB:
t: thickness [mm],
W: width [mm]

A force of approx. 220 Kgf (=2.16 KN) was calculated here for type 1 and a force of approx. 460 Kgf (=4.51 KN) was calculated for type 2, in order to compress the absorbing body completely, as described. The data for the weight of both types of absorbing body 1 according to the invention also clearly show that this body does not cause the vehicle weight to increase appreciably.

As part of the described tests, it was also discovered that the resistance of absorbing body 1 to deformation under load can be altered by rounding off the edges. The greater the radius of curvature, the greater the deformation under an applied load. The absorption characteristics of the absorbing body 1 can also be controlled by changing the quality, thickness and width of the material used and of the distances between the protruding sites, i.e. the corrugation peaks (cf. FIG. 4).

Figure 7:
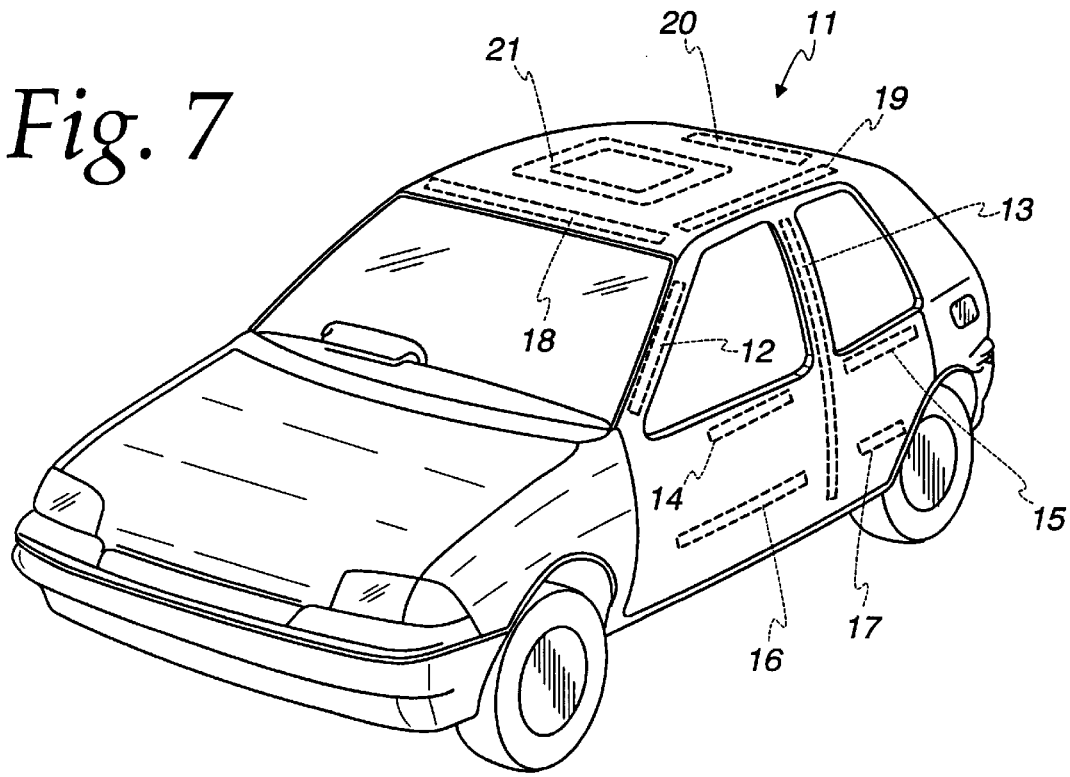
FIG. 7 shows a perspective view of a car indicating the sites at which the absorbing body according to the invention can be attached.

FIG. 7 indicates on a car 11 those sites at which the absorbing body 1 according to the invention can be advantageously attached in order to absorb the energy when the car 11 is involved in a collision. Possible installation positions for the absorbing body are, for example, the front strut of the body, i.e. the A post 12, the central strut or the B post 13, the shoulder elements 14, 15 in the doors directly below the windows, around the area roughly in the middle 16, 17 along the height of the door panels, around the strut 18 in the front section of the roof, the strut 19 at the lateral areas of the roof, around the strut 20 in the rear section of the roof and around the area 21 surrounding a sunroof. The absorbing body 1 according to the invention can develop its advantageous effect as regards increasing passenger safety within the car interior particularly if this absorbing body is attached to the aforementioned sites.

Figure 8:
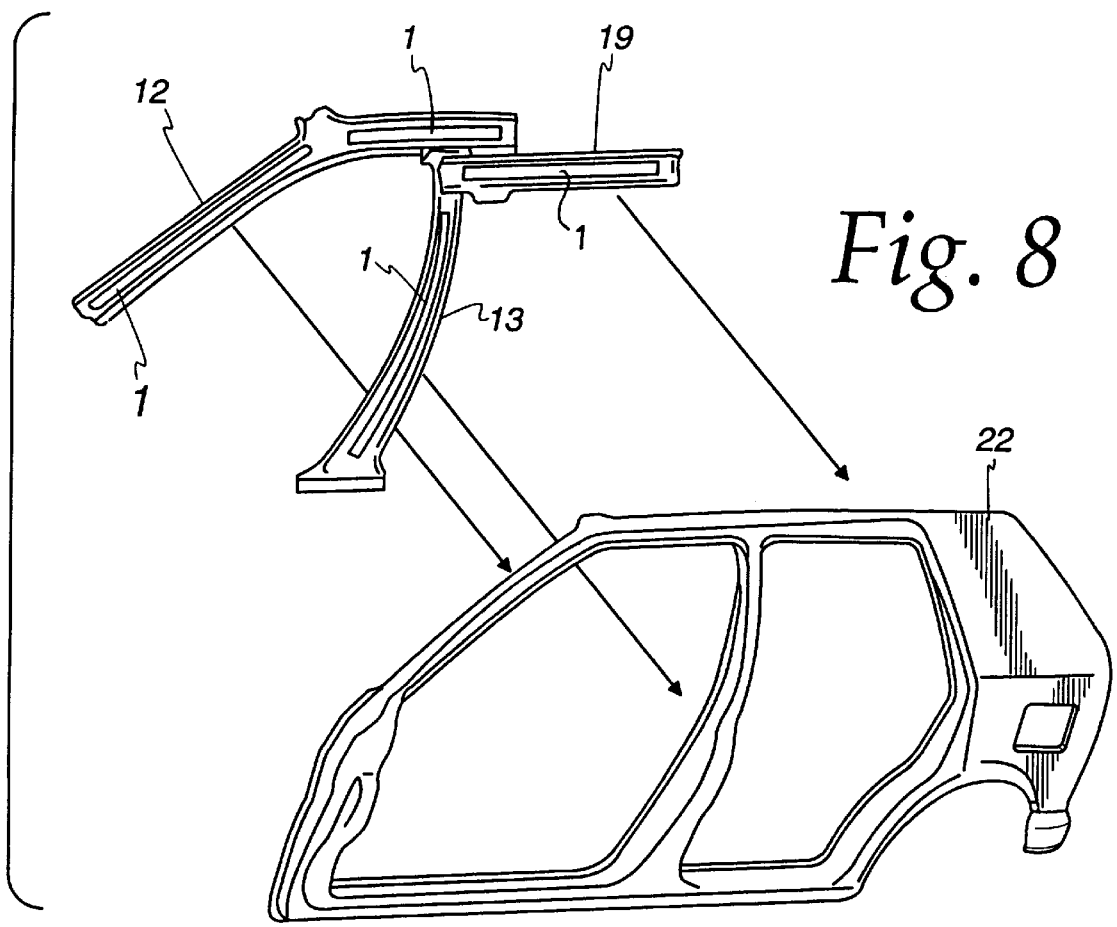
FIG. 8 shows a perspective view of parts of a vehicle body comprising the absorbing body according to the invention.

It is again illustrated in FIG. 8 how the absorbing body 1 according to the invention is attached to individual components of a car body. In the case depicted, the absorbing body 1 is attached at two points to a front strut rail 12. The absorbing body 1 is also attached to a component 13 of the B post and to a component 19 at the side of the roof. In this particular instance, the absorbing body 1 has a rectangular shape and as a result can be easily affixed directly to the respective wall by means of an adhesive. The absorbing body 1 according to the invention composed of a flexible pipe is also so pliant and yielding that it can also be attached to bent sites such as component 13.

Since the absorbing body 1 is respectively attached to the aforementioned sites of the components 12, 13, 19, these components 12, 13, 19 are welded to the lateral body part 22 which is a component of the vehicle's outer wall. When the illustrated components of a car body are assembled, the absorbing body 1 is therefore located between the outer wall the inner wall of the vehicle in each case, thus effecting a deformation in the absorbing body 1 when a force acts upon the outer wall, and the impact energy is already cushioned in this area. The absorbing body 1, as evident from FIG. 6, can particularly absorb a large force when there is comparatively little deformation, thus increasing passenger safety in a car. Despite considerable energy absorption, neither the absorbing body nor the components on the inside of the car are in fact subject to any extensive deformations during the initial phase of an impact.

Figure 9:
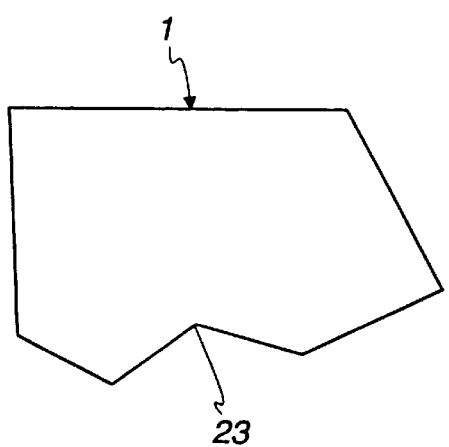
FIG. 9 shows a schematic cross-sectional view of a special embodiment of the absorbing body.

A special embodiment of the absorbing body 1 according to the invention is shown in FIG. 9 as a schematic cross section. It can be identified here that according to a preferred embodiment of the invention, the wall of the absorbing body 1 cross-sectionally extends such as to bend inwards to form a negative angle 23. Whereas an (inwardly applied) angle between 0° and at most 180° is present between the individual, largely straight wall sections of the absorbing body 1 at the remaining corners of the depicted polygon, this (equally inwardly applied) angle at the site 23 is more than 180°, thus causing this angle to be designated as a negative angle 23. In this embodiment, the absorbing body 1 according to the invention can, in terms of its cross section, be adapted particularly well to the shape of the surrounding components and to the necessary orientations in order to absorb impact energy.

It should also be noted that although FIGS. 7 and 8 depict zones of the surrounding area of the occupant cell in which the absorbing body 1 can be attached, the absorbing body 1 is also suitable for attachment in the area surrounding the engine chamber in order to absorb considerable impact forces with an initially low deformation in this area as well.

The helically shaped pattern of the grooves that can be identified in FIGS. 1 and 2 is also arrived at from the fact that the illustrated example relates to a winding tube. The grooves and elevations can also each be designed as circles that revolve on the outside of the pipe if this is obtained from a corresponding production process. The necessary flexibility can also be achieved for the absorbing body 1 according to the invention by means of a circular shape of the elevations and grooves.

What is claimed is:

1. An absorbing body for absorbing impact force, said absorbing body being formed by a flexible pipe (or tube), wherein
the wall of the pipe is built up of a plurality of layers and comprises at least one metal layer and at least one paper or plastic layer,
said absorbing body is adapted in terms of its cross section such as to form at least one largely straight wall portion which is largely parallel to the direction from which the force is expected, and
said absorbing body can be deformed such that impact force can be absorbed.

2. An absorbing body according to claim 1, wherein said absorbing body comprises a winding tube helically wound from a plurality of strips and has grooves helically revolving on the tube periphery.

3. An absorbing body according to claim 2, wherein the strips are wound with lateral overlaps.

4. An absorbing body according to claim 1, wherein said metal layer comprises aluminum, an aluminum alloy or steel.

5. An absorbing body according to claim 1, wherein said absorbing body comprises a paper or plastic layer both on the inside and on the outside of its wall.

6. An absorbing body according to claim 1, wherein said absorbing body comprises a number of metal layers divisible by two, the materials of respectively two adjoining, randomly combined layers being chosen from the materials aluminum, an aluminum alloy and steel.

7. An absorbing body according to claim 1, wherein the direction of the largely straight wall portion in the installation state of said absorbing body extends at an angle of not more than 15°, preferably not more than 5° to the direction from which the impact force is expected.

8. An absorbing body according to claim 1, wherein said wall portion which is largely straight in the installation state of said absorbing body is bulged, when viewed in cross section, in the middle of its length to an extent that is not greater than one fifth, preferably one twentieth of the length of said wall portion.

9. An absorbing body according to claim 1, wherein said absorbing body comprises a polygonal cross section, the corners of which are rounded off.

10. An absorbing body according to claim 1, wherein the cross section of said absorbing body is symmetrical, preferably quadratic, rectangular, rhombic, hexagonal or octagonal.

11. An absorbing body according to claim 1, wherein the cross section of said absorbing body is asymmetrical.

12. An absorbing body according to claim 1, wherein said absorbing body comprises at least one wall portion which is concavely or convexly curved.

13. An absorbing body according to claim 1, wherein said absorbing body comprises a cross section, in the course of which the wall of said absorbing body is inwardly bent at at least one site to form a negative angle.

14. A use of a flexible pipe, the wall of which is built up of a plurality of layers and comprises at least one metal layer and at least one paper or plastic layer, and the cross section of which is designed such as to form at least one largely straight wall portion which in the installation state of the pipe is largely parallel to the direction from which a force is expected, as a body for absorbing impact energy.

15. A use according to claim 14, wherein the direction of said largely straight wall portion extends at an angle of not more than 15°, preferably not more than 5° to the direction from which the force is expected.

16. A combination of an absorbing body according to claim 1 and at least one component of a vehicle body, preferably an inner wall and an outer wall to which said absorbing body is secured such that its largely straight wall portion in the installation state of said absorbing body extends largely parallel to the direction from which an impact force is expected.

17. A combination according to claim 16, wherein said absorbing body is attached such that the longitudinal pipe axis of said absorbing body also extends perpendicular to the direction from which an impact is expected.

* * * * *